(12) United States Patent
Sverdrup

(10) Patent No.: US 10,429,648 B2
(45) Date of Patent: Oct. 1, 2019

(54) AUGMENTED REALITY HEAD WORN DEVICE

(71) Applicant: Lawrence Sverdrup, San Diego, CA (US)

(72) Inventor: Lawrence Sverdrup, San Diego, CA (US)

( * ) Notice: Subject to any disclaimer, the term of this patent is extended or adjusted under 35 U.S.C. 154(b) by 0 days.

(21) Appl. No.: 15/257,883

(22) Filed: Sep. 6, 2016

(65) Prior Publication Data

US 2017/0227771 A1  Aug. 10, 2017

Related U.S. Application Data

(60) Provisional application No. 62/214,149, filed on Sep. 3, 2015.

(51) Int. Cl.
*G02B 27/01* (2006.01)
*G02B 27/00* (2006.01)
*G02B 5/28* (2006.01)

(52) U.S. Cl.
CPC ......... *G02B 27/0172* (2013.01); *G02B 5/289* (2013.01); *G02B 27/0081* (2013.01); *G02B 2027/013* (2013.01); *G02B 2027/0112* (2013.01); *G02B 2027/0174* (2013.01)

(58) Field of Classification Search
CPC .......................... G02B 27/0172; G02B 5/289; G02B 27/0081; G02B 2027/0112; G02B 2027/013; G02B 2027/0174
USPC .......................................................... 359/13
See application file for complete search history.

(56) References Cited

U.S. PATENT DOCUMENTS

| | | | |
|---|---|---|---|
| 2012/0002256 A1* | 1/2012 | Lacoste | G02B 27/0081 359/9 |
| 2015/0036221 A1* | 2/2015 | Stephenson | G02B 27/0101 359/630 |

* cited by examiner

*Primary Examiner* — Wen Huang
(74) *Attorney, Agent, or Firm* — John R. Ross; John R. Ross, III

(57) ABSTRACT

An augmented reality head worn device having a a curve transparent mirror, a scanning light source defining a field of view, a holographic optical element adapted to provide pupil expansion to create an eye-box, and at least one projection system for providing high acuity at or near a center of the field of view.

8 Claims, No Drawings

AUGMENTED REALITY HEAD WORN DEVICE

CROSS REFERENCE TO RELATED APPLICATIONS

This application claims the benefit of Provisional Application, Ser. No. 62/214,149 filed Sep. 3, 2015

FEDERALLY SPONSORED RESEADH AND DEVELOPMENT

This invention was made with Government support under Contract No. W31P4Q-15-C-0052 awarded by the United States Army. The Government has certain rights in the invention.

FIELD OF THE INVENTION

The present invention relates to head worn devices and in particular to augmented reality head worn devices.

BACKGROUND OF THE INVENTION

Augmented reality (AR) head worn display's (HWDs) overlay digital image/video content onto the user's see-through vision of the real world. In this way, the experience includes a transparent, undisturbed view of the environment, as well as displayed wide field-of-view (FOV) color video content with which the user can interact. Interaction and control, while not necessary, can enhance the user's experience. It is by far the most commercially desirable class of HWD's but also most difficult to design and manufacture. This type of optical see-through display contrasts with other AR displays which merge live video feed recorded from the user's point-of-view with augmented video content (video relay). In these less ideal systems, the user sees the merged video feed through a display and does not directly see the external world. This is very similar to virtual reality (VR) with the main difference that in VR the user can only see the VR (not real world) environment through the video display system. These drawbacks of VR or non-see-though (video relay) AR are a fundamental obstacle in the acceptance of this technology into the mainstream consumer electronics community.

Waveguide Approach

The current mainstream approach to HWDs is known as the "waveguide" approach. A flat or slightly curved optical material (the waveguide) is placed in front of each eye. Light is injected into the material from near one of the edges, and extracted in front of the eye. There are four methods of coupling into and out of the waveguide: holographic, diffractive, mirror and polarization.[i] If the waveguide approach solved all of the aforementioned challenges, there would be nothing further to discuss. In fact, however, the waveguide approach fails in numerous key areas. Some of the limitations include the following:

Introduced Discontinuity: Waveguides tend to block peripheral vision or binocular overlap. When the light source is placed above the eyebrow (best option) the edges of the waveguide present a discontinuity to see-through vision. This discontinuity is greater for the slightly curved version with increased display FOV because they are thicker along the optical axis.

Low Transmission: Waveguides based upon mirror or polarization coupling have low see-through transmission, creating a handicap at nighttime. Increasing transmission results in reduced brightness, which is required in sunlit conditions. All coupling methods have limited transmission when broadband light sources, such as organic light emitting diodes (OLEDs), are utilized since coupling certain wavelengths limits their see-though transmission. OLEDS are too broadband to provide a red astronomer mode.

Limited FOV: Traditional flat waveguides are limited to something like a 40° FOV. The latest slightly curved waveguides have pushed this limit to 60° at the price of greatly increased thickness. With increased thickness, the edges of the waveguide present a greater discontinuity to see-through vision.

Low Brightness: Despite all of the research into the waveguide approach, no version has adequate brightness for fully sunlit conditions. At the 2015 Navy Opportunity Forum, Peter Squire stated that the forward observer training system under development for the military currently plans to utilize SA Photonics latest model slightly-curved waveguide HWD, but that it still is not bright enough in fully sunlit conditions.

No Variable Focus Solution: Waveguides generally cannot provide a variable focus display. Without variable focus, the vergence-accommodation conflict cannot be solved, and provision of comfortable "complete-3D" imagery cannot be provided.

What the waveguide approach has solved is provision of exit pupil expansion and the creation of an eye-box adequate for eye rotations. It also provides a form factor approaching that of sunglasses or safety goggles except for the see-through blockage/discontinuity issue.

SUMMARY OF THE INVENTION

Curved Transparent Mirror (CTM) Approach

Preferred embodiments of the present invention utililzes a curved transparent mirror approach. A prototype CTM is an ellipsoidal reflector, with two foci. The reflector reflects only at the display light source wavelengths, and transmits all other wavelengths, allowing the user to "see through". The light source projector is placed at one of the two foci located above the eyebrow. The second foci is locate d at the entrance pupil of the eye. All light emanating from the projector, regardless of where it bounces off of the ellipsoidal reflector, will reach the eye. CTM's allow for see-though vision whereas curved mirrors do not, however both display similar imagery. If the light source projector has a limited FOV, it can be expanded by combining the ellipsoidal reflector with a hyperboloidal reflector.[ii] Therefore, in principle, a display FOV approaching that of natural vision can be provided. This overcomes the biggest limitation of the waveguide approach.

Don Bruns at Trex proposed using an ellipsoidal reflector, but it turned out that he was not the first to consider this possibility. The first two groups to investigate this idea produced prototypes with FOVs per eye of 60°×120°. However, they discovered two issues. One is that aberrations from the curved mirror are an issue, and the provision of exit pupil expansion to provide an adequate eye-box is unsolved. The CTM in front of the eye (with a projection system above the eyebrow) can in essence be formed into something akin to wrap-around sunglasses or safety goggles. There is no inherent requirement to cause a discontinuity to see-through vision. Schonlau's prototype clearly has the desirable format of a pair of safety goggles.

Retinal Scanning

It was soon realized at Trex that the aberration problem could be dramatically reduced by combining retinal scanning display (RSD) technology with the curved transparent mirror approach. In RSD, scanning beams with good spatial coherence such as eye-safe laser beams are directed at the eye to produce imagery. The first commercial RSD display was the NOMAD device developed by Microvision although it utilized a flat fold-mirror in front of the eye (i.e. CTM with zero curvature). The Trex team has viewed, tested and verified the NOMAD device firsthand. The footprint of such beams on a curved mirror is small and the effective f-number is high, resulting in low levels of aberrations. If the footprint of each pixel on the curved mirror is large, the aberration problem becomes intractable. Another way of visualizing the problem is that laser beams with diameter small compared to the radius of curvature of the mirror appear to first order more like a ray, rather than a bundle of rays. The end result is that there is a variation in defocus from top to bottom of the ellipsoid, but other aberrations are strongly suppressed. Furthermore, with the use of small diameter beams, the depth-of-focus of the display light is substantial.

The use of scanning laser beams provides a number of further benefits. The most electrically efficient sources of light known are laser diodes (although not all laser diodes are efficient). The progression from tungsten bulbs, to compact fluorescent bulbs, to LEDs, will likely culminate with laser light bulbs. Laser light bulbs are currently being investigated at Sandia National Laboratory.[iii] Laser light bulbs are already replacing mercury bulbs in projectors and the first laser headlamps in high-end cars are nearing reality.[iv]

Therefore, in principle, an optimal light generating mechanism in a display will utilize laser diodes. A second benefit is that use of narrowband light means that the reflective coating on the CTM need only reflect a small proportion of the photopic band, resulting with the benefit that high photopic transmission can be provided. Rugate coatings can provide high reflection at chosen wavelengths while maintaining excellent transmission across the rest of the spectrum. They have been proven to reflect color imagery and provide photopic transmission exceeding 80%.[v] In RSD there is no speckle whatsoever, provided that the beams do not impinge on a diffusing surface en route to the eye.

With the RSD approach, an electrically-activated variable lens placed just prior to the scanning mirror can be used to affect the divergence/convergence of the scanning beams, and thereby provide a display with variable focus. This lens can also be used to correct the vertical focus variation due to the ellipsoidal geometry with the light source above the eyebrow. It can additionally be utilized to fix the accommodation-vergence conflict causing simulator sickness in persons watching conventional 3D movies.[vi] RSD utilizes scanning laser beams efficiently delivered to the eye. Providing adequate brightness outdoors for use in fully sunlit conditions is not a problem.

Adequate Size Eye-Box

The remaining challenge is to provide exit pupil expansion sufficient to create an eye-box of adequate size. The NOMAD device utilized a novel refractive/diffractive device based upon dual micro-lens arrays. It has only been manufactured in a flat geometry, which is not optimal for the CTM approach. The first approach explored at Trex was to utilize eye tracking to locate the entrance pupil of the eye, and to move the laser scanner so as to parry the relative movements of the eye. Alternatively, an optical method of making the scanner appear to move could be utilized. In the ellipsoidal design, when the scanner is moved away from the upper "focus" of the ellipsoid, the beams no longer intersect at a point near the lower focus near the eye. Instead, the further the exit pupil is caused to move from the lower focus of the ellipsoid, the larger the diameter of the "circle of least confusion" becomes (in analogy to the situation of spherical aberration in a conventional lens). This effect limits the potential size of the eye-box. Mechanically moving the scanner is possible but undesirable. To make the light projection source appear to move, Nagahara et. al. proposed to utilize tilt generated in LCDs. However, the tilt levels possible are small unless the LCD is thick, in which case it is slow. Electro-wetting is another possibility, which is fast but the levels of tilt possible again are not large. Trex proposed using a pair of curved polarization gratings to make the scanner appear to move. Polarization grating can scan large diameter beams over very large angles. In principle, this could be made to work in full color and has been demonstrated in two color systems. However, the only company with experience making these devices, Boulder Nonlinear, has never made a compact version on thin glass substrates, let alone curved substrates. In addition, they wanted ≈$100 k to make a prototype of any sort. The consensus was that this technology is not matured sufficiently since there is no commercial product utilizing them.

Moving Scanner Approach

There was another challenge. The conventional optical design software packages (e.g. Zemax, Code-V, FRED) do not include provisions for easily working with off-axis conics. Trex's optical designer resorted to importing the off-axis conics into Zemax via Matlab code. This made iterations on the basic design slow and limited the optimization space. This problem was resolved by utilizing the Mathematica-based software Optica. The "moving scanner" approach to creating an eye-box essentially keeps etendue fixed, moving the optical system around in time. Etendue can never be decreased, which would represent a violation of the second law of thermodynamics. (Using only 100% reflectors and refractive lens elements, etendue is conserved.)[vii] If beam expansion is utilized to expand the eye-box while conserving etendue, the FOV is decreased in proportion. Therefore, this approach is not useful for a display with wide FOV. The conventional approach to exit pupil expansion is to increase etendue utilizing any of the following: beam-splitters, diffraction, holography or diffusers. For instance, a 50% beam splitter takes a pulse of light with some divergence and volume, and essentially doubles the volume and occupied angular space. A diffraction grating can be designed to create an un-diffracted zero-order beam and two first order (±1 order) diffracted beams, all of equal intensity, thereby tripling the volume and occupied angular space.

Holographic Approach to Exit Pupil Expansion

Trex is pursuing a novel holographic approach to generate exit pupil expansion without the use of waveguides. Holograms used for HWD applications is not a new idea, they have been used previously to generate exit pupil expansion in waveguide-based HWDs. The novelty of our approach is that the HOE can simultaneously create a large eye-box while maintaining a wide FOV not yet achieved in waveguide approaches. The optical design software Optica, utilized for working with off-axis conics, can also be used to model holographic optical elements (HOEs). To clarify, the term hologram often implies it contains 3D images, whereas, the term HOE does not. In particular, unlike display holograms, there is no image stored in an HOE. Instead the HOE behaves like a lens system but without the limitations of a traditional lens (such as the conservation of etendue limitation).

The terms "hologram" and "grating" are used to mean HOE. It turns out that the HOEs can be utilized to correct for the "circle of least confusion" issue mentioned previously in regards to expanding the eye-box. One exciting possibility is that the size of the eye-box might be increased sufficiently to provide automatic fitting to a large fraction of the population. With HOEs, the ellipsoidal reflector can be replaced with a spherical reflector, as the functionality provided by the ellipsoid can be incorporated into the HOEs. A spherical curved transparent mirror is easier to manufacture and position correctly.

With HOEs a new method of providing foveation arises. The original Trex concept was to have two projection systems, one to supply pixels for a high-acuity zone (which may be centered in the display FOV or movable to track the gaze) and a second projector to provide the wide display FOV image with reduced acuity. Trex has already demonstrated a roving zone with enhanced acuity. However, the simplest version of foveation is to provide high-acuity in the center of the display FOV where the gaze is present most of the time, and low-acuity in the peripheral display FOV, which is also the peripheral FOV of the wearer most of the time. Whenever the wearer desires to look at a virtual object with high-acuity, they simply turn their head to point in the vicinity of the virtual object. Foveation using a single projector per eye can be accomplished when pixel density warping is implemented in the HOEs. Keystone warping correction of the overall image can also be implemented in the HOEs at the same time. Trex is working on designs that show HOEs can be made to perform a number of extremely useful functions. Trex is collaborating with Technicolor to manufacture computer generated HOEs. Computer generated surface HOEs manufactured with state of the art technology will be utilized to program the volume HOEs utilized in the HWD.

Augmented reality (AR) head worn display's (HWD) overlay digital image/video content onto the user's see-through vision of the real world. In this way, the experience includes a transparent, undisturbed view of the environment, as well as displayed wide field-of-view (FOV) color video content with which the user can interact. Interaction, while not necessary, can enhance and control the user's experience. It is by far the most commercially desirable class of HWD's but also the hardest to design and manufacture. This type of video relay display contrasts other AR displays which merge live video feed recorded from the user's point-of-view with augmented video content. In these less ideal systems, the user sees the merged video feed through a display and does not directly see the external world. This is very similar to virtual reality (VR) with the main difference that in VR the user can only see the VR (not real world) environment through the video display system. These drawbacks of VR or non-see-though AR are a fundamental obstacle in the acceptance of this technology into the mainstream consumer electronics community.

An ideal AR HWD has a light-weight goggle or eye-glass form-factor that seamlessly blends real world and artificial experiences without compromising the presentation quality of either. The user of such a system should not feel any discomfort, eye fatigue, or added weight. In fact, the high comfort level enables the user to become unaware they are wearing the device, allowing it to be worn for extended periods of time. The AR content interaction and comfortable form of the HWD should lead users to be inclined to its daily use.

The device will feature binocular color vision with automatic adjustment to the anatomical differences in head size, eye separation, eye alignment, and eye relief within a large population of users. Ideally, the device would compensate for a user's natural eye defocus/aberrations in order to eliminate the need for any additional prescription eyewear or contact lenses. In addition, the ideal HWD would include an eye tracking system to control the HWD standard operation, and if desired, to enable the control of content and/or the user's experience though hands free graphical user interface (gui) menus. The HWD should mimic the human visual system in order to efficiently allocate hardware resources only as needed. High-acuity narrow field-of-view (FOV) and lower-acuity wide FOV content is displayed to the user's fovea and the rest of the retina, respectively. Additionally, localized occlusion of see-through vision can assist in making the display content appear more vivid. Each of these systems would be tightly integrated into a small ergonomic package.

The Trex approach to developing an optical see-through HWD attempts to follow a logical path toward the optimum solution. There are many desirable features in a HWD. The waveguide approach entails numerous possibly unsurmountable limitations, which prevent attainment of many of the key desirable features. The curved transparent mirror approach appears to allow for a solution to providing all of the desirable features.

Desirable Features in a HWD

Desirable features in an optical see-through HWD include the following:

First and foremost does not harm natural see-through vision
    Provide see-through transmission adequate for all conditions, including nighttime
    Does not block peripheral vision (so as not to be hit by a car when crossing the street), does not block binocular overlap (to preserve depth perception) and does not block the view downwards (which would interfere with mobility)
    Does not cause a discontinuity to see-through vision (a flat beam splitter in front of the eye introduces such a discontinuity)
Provide a wide display field-of-view (FOV), ideally approaching that of natural vision
    For many applications such as training and gaming, the virtual objects should not disappear in peripheral vision when the user's head is not pointed near them
    A wide FOV promotes a feeling of "immersion" and makes the experience more realistic Provide high-acuity, ideally approaching that of natural vision.
  A benchmark is 20/20, but in fact the average best corrected vision for young adults is better than 20/15[viii]
Incorporate a method of display foveation, similar to that inherent in human vision, to allow simultaneous provision of a wide FOV and high-acuity
Minimize data transmission bandwidth
Minimize power consumption
Provide an eye-box of adequate size
  Must at least cover the comfortable range of eye rotations (±15°)[ix]
  May additionally be used to cover slippage of the HWD with respect to the eyes
  May additionally be used for fitting purposes, to cover the inter-pupillary distance (IPD) spectrum of the population
Adequate brightness for use in full sunlit conditions, adequate reduction in brightness in dark conditions, red astronomer mode[x] which allows and preserves dark adaptation
Best possible color gamut, with uniform color balance and luminosity
Provide a variable focus display
Provide fully binocular vision and avoid displaying dichoptic imagery
  A Dichoptic display can cause: luning, binocular rivalry, deficits in contrast threshold & slower target acquisition[xi]
Provide occlusion for virtual objects
Does not induce "simulator sickness" by providing unnatural and inconsistent information (cues) to the brain
Form factor of sunglasses or safety goggles Limitations of the Waveguide Approach The current mainstream approach to HWDs is known as the "waveguide" approach. A flat or slightly curved optical material (the waveguide) is placed in front of each eye. Light is injected into the material from near one of the edges, and extracted in front of the eye. There are four methods of coupling into and out of the waveguide: holographic, diffractive, mirror and polarization.[xii] If the waveguide approach solved all of the aforementioned challenges, there would be nothing further to discuss. In fact, however, the waveguide approach fails in numerous key areas. Some of the limitations include the following:
  Introduced Discontinuity: Waveguides tend to block peripheral vision or binocular overlap. When the light source is placed above the eyebrow (best option) the edges of the waveguide present a discontinuity to see-through vision. This discontinuity is greater for the slightly curved version with increased display FOV because they are thicker along the optical axis.
  Low Transmission: Waveguides based upon mirror or polarization coupling have low see-through transmission, creating a handicap at nighttime. Increasing transmission results in reduced brightness, which is required in sunlit conditions. All coupling methods have limited transmission when broadband light sources, such as organic light emitting diodes (OLEDs), are utilized since coupling certain wavelengths limits their see-though transmission. OLEDS are too broadband to provide a red astronomer mode.
  Limited FOV: Traditional flat waveguides are limited to something like a 40° FOV. The latest slightly curved waveguides have pushed this limit to 60° at the price of greatly increased thickness. With increased thickness, the edges of the waveguide present a greater discontinuity to see-through vision.
  Low Brightness: Despite all of the research into the waveguide approach, no version has adequate brightness for fully sunlit conditions. At the 2015 Navy Opportunity Forum, Peter Squire stated that the forward observer training system under development for the military currently plans to utilize SA Photonics latest model slightly-curved waveguide HWD, but that it still is not bright enough in fully sunlit conditions.
  No Variable Focus Solution: Waveguides generally cannot provide a variable focus display. Without variable focus, the vergence-accommodation conflict cannot be solved, and provision of comfortable "complete-3D" imagery cannot be provided.

What the waveguide approach has solved is provision of exit pupil expansion and the creation of an eye-box adequate for eye rotations. It also provides a form factor approaching that of sunglasses or safety goggles except for the see-through blockage/discontinuity issue.

History & Potential of the "Curved Transparent Mirror" (CTM) Approach

The prototype CTM is an ellipsoidal reflector, with two foci. The light source projector is placed at one of the two foci located above the eyebrow. The second foci is located at the entrance pupil of the eye. All light emanating from the projector, regardless of where it bounces off of the ellipsoidal reflector, will reach the eye. CTM's allow for see-though vision whereas curved mirrors do not, however both perform similar display imagery. If the light source projector has a limited FOV, it can be expanded by combining the ellipsoidal reflector with a hyperboloidal reflector.[xiii] Therefore, in principle, a display FOV approaching that of natural vision can be provided. This overcomes the biggest limitation of the waveguide approach.

Don Bruns at Trex proposed using an ellipsoidal reflector, but it turned out that he was not the first to consider this possibility. The first two groups to investigate this idea produced prototypes with FOVs per eye of 60°×120°.[xiv] However, they discovered two issues. One is that aberrations from the curved mirror are an issue, and the provision of exit pupil expansion to provide an adequate eye-box is unsolved. The CTM in front of the eye (with a projection system above the eyebrow) can in essence be formed into something akin to wrap-around sunglasses or safety goggles. There is no inherent requirement to cause a discontinuity to see-through vision. Schonlau's prototype clearly has the desirable format of a pair of safety goggles.

It was soon realized at Trex that the aberration problem could be dramatically reduced by combining retinal scanning display (RSD) technology with the curved transparent mirror approach. In RSD, scanning beams with good spatial coherence such as eye-safe laser beams are directed at the eye to produce imagery. The first commercial RSD display was the NOMAD device developed by Microvision although it utilized a flat fold-mirror in front of the eye. The Trex team has viewed, tested and verified the NOMAD device firsthand. The footprint of such beams on a curved mirror is small and the effective f-number is high, resulting in low levels of aberrations. If the footprint of each pixel on the curved mirror is large, the aberration problem becomes intractable. Another way of visualizing the problem is that laser beams with diameter small compared to the radius of curvature of the mirror appear to first order more like a ray, rather than a bundle of rays. The end result is that there is a variation in defocus from top to bottom of the ellipsoid, but high-order aberrations are strongly suppressed. Furthermore, with the use of small diameter beams, the depth-of-focus of the display light is substantial.

The use of scanning laser beams provides a number of further benefits. The most electrically efficient sources of light known are laser diodes (although not all laser diodes are efficient). The progression from tungsten bulbs, to compact fluorescent bulbs, to LEDs, will likely culminate with laser light bulbs. Laser light bulbs are currently being investigated at Sandia National Laboratory.$^{xv}$ Laser light bulbs are already replacing mercury bulbs in projectors and the first laser headlamps in high-end cars are nearing reality.$^{xvi}$ Therefore, in principle, an optimal light generating mechanism in a display will utilize laser diodes. A second benefit is that use of narrowband light means that the reflective coating on the CTM need only reflect a small proportion of the photopic band, resulting with the benefit that high photopic transmission can be provided. Rugate coatings can provide high reflection at chosen wavelengths while maintaining excellent transmission across the rest of the spectrum. They have been proven to reflect color imagery and provide photopic transmission exceeding 80%.$^{xvii}$ In RSD there is no speckle whatsoever, provided that the beams do not impinge on a diffusing surface en route to the eye.

With the RSD approach, an electrically-activated variable lens placed just prior to the scanning mirror can be used to affect the divergence/convergence of the scanning beams, and thereby provide a display with variable focus. This lens can also be used to correct the vertical focus variation due to the ellipsoidal geometry. It can additionally be utilized to fix the accommodation-vergence conflict causing simulator sickness in persons watching conventional 3D movies.$^{xviii}$ RSD utilizes scanning laser beams efficiently delivered to the eye. Providing adequate brightness outdoors for use in fully sunlit conditions is not a problem.

The remaining challenge is to provide exit pupil expansion sufficient to create an eye-box of adequate size. The NOMAD device utilized a novel refractive/diffractive device based upon dual micro-lens arrays.$^{xix}$ It has only been manufactured in a flat geometry, which is not directly applicable to the CTM approach. The first approach explored at Trex was to utilize eye tracking to locate the entrance pupil of the eye, and to move the laser scanner so as to parry the relative movements of the eye. Alternatively, an optical method of making the scanner appear to move could be utilized. In the ellipsoidal design, when the scanner is moved away from the upper "focus" of the ellipsoid, the beams no longer intersect at a point near the lower focus near the eye. Instead, the further the exit pupil is caused to move from the lower focus of the ellipsoid, the larger the diameter of the "circle of least confusion" becomes (in analogy to the situation of spherical aberration in a conventional lens). This effect limits the potential size of the eye-box. Mechanically moving the scanner is possible but undesirable. To make the light projection source appear to move, Nagahara et. al. proposed to utilize tilt generated in LCDs.$^{xx}$ However, the tilt levels possible are small unless the LCD is thick, in which case it is slow. Electro-wetting is another possibility, which is fast but the levels of tilt possible again are not large. Trex proposed using a pair of curved polarization gratings to make the scanner appear to move. Polarization grating can scan large diameter beams over very large angles. In principle, this could be made to work in full color and has been demonstrated in two color systems. However, the only company with experience making these devices, Boulder Nonlinear, has never made a compact version on thin glass substrates, let alone curved substrates. In addition, they wanted ≈$100 k to make a prototype of any sort. The consensus was that this technology is not matured sufficiently since there is no commercial product utilizing them.

There was another challenge. The conventional optical design software packages (e.g. Zemax, Code-V, FRED) do not include provisions for easily working with off-axis conics. Trex's optical designer resorted to importing the off-axis conics into Zemax via Matlab code. This made iterations on the basic design slow and limited the optimization space. This problem was resolved by utilizing the Mathematica-based software Optica.$^{xxi}$ The "moving scanner" approach to creating an eye-box essentially keeps etendue fixed, moving the optical system around in time. Etendue can never be decreased, which would represent a violation of the second law of thermodynamics. (Using only 100% reflectors and refractive lens elements, etendue is conserved.)$^{xxii}$ If beam expansion is utilized to expand the eye-box while conserving etendue, the FOV is decreased in proportion. Therefore, this approach is not useful for a display with wide FOV. The conventional approach to exit pupil expansion is to increase etendue utilizing any of the following: beam-splitters, diffraction, holography or diffusers. For instance, a 50% beam splitter takes a pulse of light with some divergence and volume, and essentially doubles the volume and occupied angular space. A diffraction grating can be designed to create an un-diffracted zero-order beam and two first order (±1 order) diffracted beams, all of equal intensity, thereby tripling the volume and occupied angular space.

Trex is pursuing a novel holographic approach to generate exit pupil expansion without the use of waveguides. Hologram use for HWD applications is not a new idea, they have been used previously to generate exit pupil expansion in waveguide-based HWDs.$^{xxiii}$ The novelty of our approach is that the HOE can simultaneously create a large eye-box while maintaining a wide FOV not yet achieved in waveguide approaches.

The optical design software Optica, utilized for working with off-axis conics, can also be used to model holographic optical elements (HOEs). To clarify, the term hologram often implies it contains 3D images, whereas, the term HOE does not. In particular, unlike display holograms, there is no image stored in an HOE. Instead the HOE behaves like a lens system but without the limitations of a traditional lens (such as the conservation of etendue limitation).

For the purposes of this report the use of the terms "hologram" and "grating" is used to mean HOE. It turns out that the HOEs can be utilized to correct for the "circle of least confusion" issue mentioned previously in regards to expanding the eye-box. One exciting possibility is that the size of the eye-box might be increased sufficiently to provide automatic fitting to a large fraction of the population. With HOEs, the ellipsoidal reflector can be replaced with a spherical reflector, as the functionality provided by the ellipsoid can be incorporated into the HOEs. A spherical curved transparent mirror is easier to manufacture and position correctly.

With HOEs a new method of providing foveation arises. The original Trex concept was to have two projection systems, one to supply pixels for a high-acuity zone (which may be centered in the display FOV or movable to track the gaze) and a second projector to provide the wide display FOV image with reduced acuity. Trex has already demonstrated a roving zone with enhanced acuity. However, the simplest version of foveation is to provide high-acuity in the center of the display FOV where the gaze is present most of the time, and low-acuity in the peripheral display FOV, which is also the peripheral FOV of the wearer most of the time. Whenever the wearer desires to look at a virtual object with high-acuity, they simply turn their head to point in the vicinity of the virtual object. Foveation using a single projector per eye can be accomplished when pixel density warping is implemented in the HOEs. Keystone warping correction of the overall image can also be implemented in the HOEs at the same time. Trex is working on designs that show HOEs can be made to perform a number of extremely useful functions. Trex is collaborating with Technicolor to manufacture computer generated HOEs. Computer generated surface HOEs manufactured with state of the art technology will be utilized to program the volume HOEs utilized in the HWD.

TREX Holographic Baseline Design System Overview

Trex Enterprises Corporation (TREX) has created a design that addresses many of the requirements for the highly sought HWD. Methods to extend the functionality of our design to meet the remaining requirements of the ideal HWD have been identified and effort to incorporate them into the baseline design has begun. A development path for each component and subsystem has been established in order to transition the TREX design into a fabricable product. This includes identifying materials, components, modules, fabrication methods, and testing protocols that can be exercised within TREX or from local vendors. Specialized consultants guided by TREX engineering experts will validate and ensure that the deliverable HWD prototypes meet specification and schedule requirements.

The baseline optical design, which uses a RSD comprised of modulated red, green, and blue lasers and microelectromechanical systems (MEMS) micro-mirror raster scanner to encode the display video content. This video illumination system passes through conditioning and focusing optics onto a hologram which corrects for optical aberrations, replicates the image signal to create an eye-box, and then redirects the light toward a CTM. This display content is then reflected off the CTM onto the retina of the user. TREX simulations show that this holographic design can be used to achieve an expanded eye-box size of greater than 10 millimeters and a field-of-view (FOV) that is 80 degrees horizontal by 45 degrees vertical; however, this is not the theoretical limit. A rugate coating will be deposited onto the CTM in order to be highly reflective at the projector laser wavelengths (450 nm, 530 nm, 635 nm) while allowing the mirror to remain optically transparent for the rest of the visible spectrum. As such, the mirror can be >80% transparent for see-through vision.

In addition, it is possible to add high-acuity to the optical system by warping the image from the projection system to create foveation. A warping function is shows how two holographic optical elements are used to map an equally spaced display into a foveated resolution that matches the non-spatially uniform acuity of the human eye. This approach will most efficiently address the needs of the HWD.

A further improvement to the baseline design could be the use of volume-based hologram technology, such as photopolymer instead of surface hologram technology. This enables the eye-box size to increase substantially at the price of a more challenging mass production process. With the use of volume holograms, the eye-box size could be increased to eliminate any adjustment of the inter-pupil eye distance accommodation. See APPENDIX C for further discussion of the eye-box formation.

The following table expresses a crude estimate of cost of the subsystems and components, as well as the labor and infrastructure, needed to assemble the color binocular foveated HWD described in this report.

TABLE 1

Cost estimate analysis for 10 million volume unit production. See the end of each respective sections for a more detailed discussion.

| Component/System | Volume production unit cost |
|---|---|
| Eye-head Measurement System | $10 |
| Ambient Light Measurement System | <$1 |
| Automated Mechanical IPD Adjustment | $5 |
| Digital Processing Unit ASIC | $10 |
| Video Projector Module | $20 |
| Hologram Optics | $5 |
| Curved Transparent Mirror | <$1 |
| Rugate Coating | $2 |
| Localized Opacity Control | $10 |
| Dynamic Focus Control | <$1 |
| Battery | $5 |
| Assembly and Integration of HWD System | $20 |
| Total | $90 |

Subsystem Overview

This chapter provides an overview of each HWD subsystem and describes how they interact in unison to enable the functionality sought by the prototype. The sections detailing each subsystem begin with a performance specification of the subsystem and a brief summary of the section's contents. This summary information is followed by a more in depth description of the findings which include: a performance limiting component analysis, roadmap to the 2020 production year, forecast of component development and emerging technology that will impact the HWD during this timeframe, top engineering challenges, and annual unit volume cost analysis. This component-by-component analysis is invaluable in estimating the technological course the HWD will take in the next 5 years. It will also serve to best identify the limiting components, alternate technologies, and where R&D resources should be invested. The subsystem cost analysis will aid in estimating the total volume production costs of a consumer grade foveated, color, binocular, augmented reality HWD system.

Eye-head Measurement System (EHMS)

Many well developed commercial-off-the-shelf (COTS) eye-head measurement systems (EHMS) are readily available. They employ relatively simple hardware optics and electronics coupled with more sophisticated software algorithms. The EHMS addresses a problem that is deceivingly simple; however, erroneous measurements are easily caused by variations in the optical characteristics of the anatomy of the eyes and faces of the population of users. Considerable work has been done to produce EHMS's that provide accurate measurements for a wide range of users. It is beneficial to utilize COTS technology for any HWD system since the cost to reproduce their performance is non-negligible. In what follows, we discuss the hardware configuration of a typical EHMS. This section is included to show how the EHMS works and how its output measurement signals are used to control other subsystems. Volume costs of the eye-head measurement system include the infrared LED emitter, camera, and mechanical supports to maintain their position. Additionally an inertial measurement unit (IMU) will be used to track the position of the users head. Of great importance is the dedicated software and processing electronics needed to interpret the raw data in order to produce valid output signals. This software would need to be adopted from third party companies or developed in-house in order to make the EHMS function properly. The estimated volume cost for the EHMS subsystem is on the order of $10 with a significant part going to software and electronic processing.

Gaze Tracking

Gaze tracking has numerous potential applications in a HWD. These include:
Hands-free communication
Hands-free control of the display and or other machines
The above applied to disabled persons
Monitoring physiological and psychological aspects of the wearer (e.g. fatigue)
Foveation—displaying high-acuity only where the wearer is looking
To measure vergence and thereby infer focus—could be used to properly focus the virtual object being looked at
In some HWD designs, to correct display aberrations associated with the current gaze angle
Trex has investigated several approaches to gaze tracking as follows:
Conventional glint +pupil eye tracking utilizing modern miniature cameras such as the OV6211
Corneal glint tracking with HWD slippage correction utilizing modern miniature cameras such as the OV6211
RSD tracking, which leverages the RSD architecture and adds a near IR diode laser and avalanche photodiode to image the retina and note the position of landmarks on the retina to infer gaze angle Tobii is a world leader in conventional eye tracking. They offer glasses with two miniature cameras imbedded in the frame below each eye. The drawback to their device is the price. When initially released a few years ago, they wanted $10 K for the glasses and $10 K for their software.

Trex has developed a simplified version of their tracker, utilizing the miniature OV 6211 camera, which is designed for eye tracking applications. The method relies solely on the movement of the primary corneal glint, and has been utilized by numerous subjects to remotely control a robot. If Trex were to successfully develop a method to automatically compensate for slippage of the HWD on the head, this method would be of great interest, since the hardware is inexpensive.

Trex has developed an RSD method of eye tracking in which the eye is "pinged" with near infrared light from all angles in the display. The infrared light reflected from the retina is returned to an avalanche photodiode (APD) which measures its intensity. Specular reflections are removed using polarization. Every frame the system essentially takes a picture of the retina. From the location of landmarks on the retina (either the fovea or the optic disc) the gaze angle is directly determined in the coordinate system of the display. The high voltage power supply required for operation of the APD is inconveniently large for incorporation in a HWD, and this matter is under investigation.

Vergence Measurements to Infer Accommodation Tracking

If the accommodative or focal state of the wearer were known, the HWD system would have the option of automatically focusing the display to be comfortably viewed by the wearer at all times. If the wearer looked at something close by, content in the display could be similarly focused. If the wearer looked in the distance, the display could automatically focus displayed content at infinity. A second application is in providing "true" or "complete" 3D imagery, in which both retinal disparity and correct focus are provided by the display. If there are virtual objects displayed at multiple ranges simultaneously, and the display focus system can only provide focus for a single range, one approach is for the display to match the current focus of the wearer.

One way to infer the focus of the wearer is to utilize eye tracking of both eyes to determine the vergence of the eyes. As the wearer looks at objects closer and closer the eyes rotate towards each other and these angles can be measured.

A second method for measuring focus of the wearer is to measure display light reflected from the retina, while varying the divergence of the light incident at the eye. The measured reflected light will be maximized at some divergence, and this divergence will have a unique correlation with the focal state of the eye.

Interpupil Distance and 3D Location Measurement

Using camera-based eye tracking, the inter-pupillary distance or IPD could be measured. A mechanical mechanism could then automatically position the displays in front of the eyes at the optimum location. One method of accomplishing this would be to utilize "squiggle" motors, which are very compact and require zero power to maintain position.[xxiv]

The IPD range that is of interest can be estimated from the following data. Inter-pupillary distance data was taken on 3976 subjects aged 17 to 51 and reported in the 1988 ANSUR database.[xxv] A review of the ANSUR and other IPD data can be found in a reference by Dodgson.[xxvi] The mean and standard deviation in the male data is 64.7 mm & 3.7 mm and in the female data is 62.3 mm & 3.6 mm.[xxvii] The mean and standard deviation for the combined data is 63.36 mm & 3.832 mm.[xxviii] The minimum value was 52 mm and the maximum value 78 mm The distribution for the combined data is used in TABLE 2 to generate horizontal eye-box dimensions to fit various percentages of the ANSUR population. The data is plotted in ERROR! REFERENCE SOURCE NOT FOUND. The data for sigma values at or beyond 2.0 is extrapolated, as there were no cases in that range.

TABLE 2

ANSUR 1988 IPD data and required horizontal eye-box
ANSUR 1988 IPD data and required horizontal eye-box

| σ | IPD Range about Mean (mm) | Percentage of Population Fit (%) | Eye-Box w /±4 mm pupil translation (mm) | Eye-Box w/ ±7 mm pupil translation (mm) | Min IPD (mm) | Max IPD (mm) |
|---|---|---|---|---|---|---|
| 0 | 0 | 0 | 8 | 14 | 63.4 | 63.4 |
| 0.5 | 3.8 | 38.2 | 11.8 | 17.8 | 59.5 | 67.2 |

TABLE 2-continued

ANSUR 1988 IPD data and required horizontal eye-box
ANSUR 1988 IPD data and required horizontal eye-box

| σ | IPD Range about Mean (mm) | Percentage of Population Fit (%) | Eye-Box w /±4 mm pupil translation (mm) | Eye-Box w/ ±7 mm pupil translation (mm) | Min IPD (mm) | Max IPD (mm) |
|---|---|---|---|---|---|---|
| 1.0 | 7.7 | 68.2 | 15.7 | 21.7 | 55.7 | 71.0 |
| 1.5 | 11.5 | 86.6 | 19.5 | 25.5 | 51.9 | 74.9 |
| 2.0 | 15.3 | 95.4 | 23.3 | 29.3 | 48.0 | 78.7 |
| 2.5 | 19.2 | 98.8 | 27.2 | 33.2 | 44.2 | 82.5 |
| 3.0 | 23.0 | 99.7 | 31.0 | 37.0 | 40.4 | 86.4 |
| 3.5 | 26.8 | 99.9 | 34.8 | 40.8 | 36.5 | 90.2 |

The minimum IPD for children of age 5 or older is around 40 mm, and is covered at the 3 sigma level.[xxix]

Head Tracking

In an optical see-through HWD, head tracking is required for several reasons. These include the following:
  To keep displayed virtual objects embedded in the real world anchored in their correct location despite head motion
  To compensate for the vestibulo-ocular reflex or VOR
  If a Minecraft creation is created on a real table in a room, it should remain on top of the table when the head moves. This is only possible if the head motion is detected and a display location correction is made in real time.

When displaying content that is not intended to be anchored in the real world, but is intended to be readable despite head motion, the vestibulo-ocular reflex needs to be considered.[xxx] If a sentence is displayed in a fixed location in a HWD and the head is rotated or translated suddenly, the sentence becomes unreadable. This is counter-intuitive as the sentence is held steady in front of the eye. However, the VOR is designed to make imagery of the inertial horizon visible despite accelerations of the head. The driver of a car has no problem seeing the countryside as they drive around sharp curves or go over bumps, because their VOR automatically corrects for the accelerations. A person reading in the back seat may become nauseated, because their VOR is attempting the same corrections, but the reading material is moving with them, not staying fixed with the inertial horizon. Simple display in a HWD corrects for the VOR correction and actually causes problems. The solution, however, is relatively simple. Anchor displayed content with the inertial horizon, and not with the head. When the quickly head rotates left, make the displayed content rotate right to keep it fixed in inertial space, and then let it slowly drift to the original relative location in the field-of-view.

Head tracking involves several layers. There are inertial measurement units (e.g. gyros and accelerometers) that measure rapid accelerations and movement. Then there are secondary measurements that keep track of slower motions and drifts (e.g. vision based tracking and magnetometers).

Ambient Light Measurement System (ALMS)

The ambient light measurement system is a very well developed COTS system that is used in countless consumer electronic applications. It is mentioned here for completeness since ambient light is used to control other systems such as the overall brightness of the video projection system. This is done so that the projector brightness coincides with the light entering the user's eyes from the environment. It can additionally be used by the EHMS to help prevent erroneous measurements due to stray light reflections from the eyes and face of the user. There are commercially available models that provide RGB ambient light values which can be used white balance the display. The volume cost per unit of this component would likely be very inexpensive in comparison with the rest of the HWD. Our estimate per unit when purchasing 10 million units is well under $1.

Automatic Mechanical Inter-pupillary Distance and 3D Location Adjustment

The IPD of the display can be set automatically using voltage data signals from the eye-head measurement system (EHMS). If the IR illumination source and the camera sensor are aligned along the vertical axis, the measured pupil position can automatically control an adjustment mechanism to move the two optical paths alignment with the user's eyes. A screw drive or squiggle motor can serve as an actuation mechanism to physically move the optics into position. It is important to note that the optical components must have vertical, lateral and longitudinal mechanical control in order to universally adapt to the user's vision requirements. This 3D position information is fed in directly from the EHMS which takes measurements of the user's eyes (see SECTION 0). The headband mechanical support of the entire system provides the freedom needed to accomplish this task with minimal hardware and interference. The 10 million unit volume cost for mechanical and electronic hardware needed to position the HWD to automatically accommodate the IPD of a given user is on the order of $5. This would have some impact on power consumption which can in turn lead to an increase in the battery cost.

Display Processing

The 10 million unit volume cost for the digital image processing memory and application specific integrated circuit (ASIC) capable of performing the tasks described in the following three subsections is on the order of $5.

Foveated Display Software Compensation

Our primary design uses one projection system to illuminate both the peripheral and narrow FOV views. The density of equally spaced pixels within the commercially available pixels is optically mapped to a non-uniform pixel density using holograms This remapping is done to match the foveated human visual system. In this way the displayed reposition has much better correspondence between pixel and photoreceptor density.

The software foveation architecture necessarily works in tandem with the optical foveation system. The mapping introduced by the hologram must the compensated for in software prior to displaying the imagery so that the imagery appears undistorted. A look-up-table generated from the hologram data or a calibration test grid is used in the remapping algorithm.

Additionally, the gaze tracking information from the eye measurement system (EHMS) will control what region of the display appears foveated. The circular zone where the user's gaze is fixed appears at the native resolution of the foveated display described above. Regions outside the foveated circular zone will be binned-up in software allowing for a considerable savings in battery storage, data transmission, and data processing requirements due to the large bandwidth reduction.

Position, and Orientation of Displayed Content

Head-tracking plays an integral role in HWD operation by providing the azimuth, elevation and orientation of the users head. The azimuth, elevation serial output of the eye tracker can be in the form of digital pulse width modulated (PWM) voltage signals which are compatible with current FPGA or ASIC technologies.

Head tracking is invaluable to the overall operation of such a system since it will enable to displayed content to be far more realistic that otherwise possible. The reason is that most of the object a person interacts with in their everyday environment does not move when they turn their head. Therefore the objects displayed to the user should remain fixed in position with respect to the environment not the users head. For this reason it is necessary to track the user's head movements in order to compensate for them in the displayed imagery. This allows the system to display content that appears to the user to remain fixed in position with respect to the environment.

Keystone Mapping and Image overlapping for Binocular Vision

Vergence (used to infer the accommodation of the eye) movements (measured in degrees or prism Diopters$^{xxxiixxxii}$) provided by the EHMS enable binocular display data to be actively transformed so that the two display feeds going to each eye can be registered and aligned. This transformation may be implemented using an image geometry correction transformation transform which can account for perspective and optical mapping corrections. This transformation updates automatically with the user's accommodation at a high refresh rate in a feedback loop. The baseline design is designed to have full overlap when the user is focused to a distance of 30 cm. This will work in conjunction with a variable focus lens (described in SECTION 0) so that the display information is presented at the focal depth at which the user's focus is accommodated. This reduces conflicting cues the human visual system uses to determine its surroundings. If cues that are not in agreement can cause the users to experience disorientation, sickness or nausea. The meter angle (MA) is used to get a comparable metric for accommodation and convergence. The meter angle equals the reciprocal of the viewing distance and its value is approximately equal to the accommodative stimulus in diopters.

Video Illumination and Modulation Projection Module

Microvision refers to their biaxial scanning MEMS units combined with modulated laser diodes as an "integrated photonics module" or IPM.

Microvision initially manufactured a WVGA format IPM (848×480) which was incorporated into their commercial scanning laser Pico projectors, such as the ShowWX and the ShowWX+HDMI units. Microvision later manufactured a 720p IPM (720×1280). These are no longer manufactured by Microvision. Their magnetic drive technology utilizes low-voltages unlike electrostatic MEMS, which utilize much higher drive voltages. Microvision technology may offer currently the best high-frequency MEMS mirrors.$^{xxxiii}$ Currently there are several manufacturers of miniature laser scanning projection modules. They include the following:

1. Celluon is selling Pico projectors containing IPMs utilizing Microvision-licensed technology. It is believed that the IPMs are manufactured by Sony.$^{xxxiv}$ These IPMs offer a "bastard" resolution of 720×1920. The resolution is 720 p vertical and 1080 p horizontal. Previously it is known that Microvision manufactured a 720 p IPM. The logical inference is that they have no trouble modulating the diode lasers fast enough to provide 1920 pixels per line, but that they did not increase the horizontal resonant frequency of the MEMS mirror sufficiently beyond the minimum necessary for operation at 720p at 60Hz: (720/2)×60 Hz=21.6kHz to reach the minimum required for 1080 p at 60 Hz: (1080/2)×60 Hz=32.4kHz. The Celluon IPMs utilize 5 lasers rather than three. There are two red, two green and one blue diode lasers. Looking with a simple handheld spectrometer, the two green lines are separated by perhaps 2nm, as are the two red lines. A theory is that they are trying to minimize speckle in the projected imagery. The PicoAir model connects only wireless with Miracast-enabled Android and DNLA. The PicoPro model connects with HDMI cable, DLNA and Miracast.

2. Microvision has informed us that IM Electronics in Korea is manufacturing 720 p units very similar to their original 720 p units. In August 2015 they informed us that units cannot be purchased directly from IM Electronics, but that we will be able to purchase them from Microvision.

3. Maradin Technologies Ltd. located in Israel manufactures a biaxial MEMS laser scanning development kit with resolution of 600×854, an optical scan range of 36°×27°, an effective mirror size of 1.0×1.1 mm very similar in size to that of Microvision, drive electronics and the following lasers: 120 mW at 638 nm, 50mW at 520 nm, and 80 mW at 450 nm. The frame rate is 30 Hz interlaced. The development kit is not compact like the Microvision IPMs. They have published a description of their approach.$^{xxxv}$ 4. ST Microelectronics developed a chip for operating laser MEMS scanners.$^{xxxvi}$ They announced the acquisition of an Israeli MEMS company bTendo$^{xxxvii}$ and the development of a laser scanning projector module.$^{xxxviii}$ It now appears that they are actively pursuing a laser scanner built into a smart phone.$^{xxxix}$ Their device may be more compact than the Microvision IPM. Their device may utilize two scanning mirrors rather than one biaxial mirror. The release date of an official product has not yet been officially announced.

5. Mezmeriz in conjunction with Cornell University has developed miniature laser/MEMS projection units for use in cell phones based upon carbon-fiber MEMS.$^{xl}$ They show a video of one in action on their website. One application is to increase the size of the display in cell phones when projecting on nearby surfaces, such as the desktop. These operate with low drive voltages. Their claim is that current silicon-based MEMS devices are limited by material properties, and that carbon fiber can out-perform silicon. They are working with mirrors of varying diameter and offer mirror diameters larger than 1 mm, and optical scan angles up to 180°. Their main product scans ±45° without additional optics. According to their specification sheets, they have not attained the horizontal resonant frequencies that Microvision technology has. According to correspondence they have matched Microvision resolution. According to correspondence, they are actively pursuing some forms of commercial products.

All Pico Projector devices are designed to project images on walls or other surfaces illuminated to some degree by additional light sources such as room light. In a consumer device it is possible that a user could point the scanner at the eye from a distance of 4". In order to meet the IEC 60825-1 class 2 requirement in this condition the output is limited to approximately 17 lumens.[xlii] The Celluon PicoPro projector is capable of 32 lumens and is class 3R (as are many modern day so-called "laser pointers") and has lasers each with output capability of tens of milliwatts. By comparison the power level required for RSD display are more modest.

RSD Laser Power Requirement

A benchmark for the brightness of a display useable outdoors is the luminance of a typical photographic scene in full sunlight, which is about 5000 cd/m$^2$.[xliii] It is also approximately the luminance of the full moon (maximum solar illumination) directly overhead (minimum atmospheric path).[xliii]

The power into a bright sun adapted 2.0 mm diameter pupil of the eye is:

$$P_W = 5000 \text{ cd/m}^2 \cdot \frac{\pi(2.0 \times 10^{-3} \text{ m})^2}{4} \cdot$$
$$\Omega \cdot \frac{1}{683 \text{ lumens/watt}} \cdot \frac{1}{V(\lambda)}$$
$$= 23.0 \text{ } \mu W \cdot \frac{\Omega_{sr}}{V(\lambda)}$$

Equation 1

$$P_W = 5000 \text{ cd/m}^2 \cdot \frac{\pi(2.0 \times 10^{-3} \text{ m})^2}{4} \cdot$$
$$\Omega \cdot \frac{1}{683 \text{ lumens/watt}} \cdot \frac{1}{V(\lambda)}$$
$$= 23.0 \text{ } \mu W \cdot \frac{\Omega_{sr}}{V(\lambda)}$$

In EQUATION 1, $\Omega$ is the solid angle of the scene and V is the luminous efficacy. The solid angle of a spherical rectangle is given by:[xliv]

$$\Omega = (\theta_2 - \theta_1) \cdot (\sin(\phi_2) - \sin(\phi_2))$$

Equation 2

For a display with field-of-view of 80°×45°, the solid angle is given by:

$$\Omega = 80° \cdot \frac{\pi}{180°} \cdot (\sin(45°)) = 0.987 \text{ sr} = 1.0 \text{ sr}$$

Equation 3

Therefore to match a bright daytime scene using 555 nm (for which V($\lambda$)=1.0) in a display with FOV of 1.0 steradian requires a power into the eye of 23 micro-watts. To reproduce this at 532nm (for which V($\lambda$)=0.8832) requires 26 $\mu$W. This is power into the eye.

For a static eye-box, the required power increases by a factor equal to the ratio of the pupil area to the eye-box area. In this case it should be noted that the pupil diameter is typically much larger than 2.0 mm as sunglasses are typically worn in bright sunlit conditions. If a 3 mm diameter is assumed, and a large eye-box per eye of 9 mm×20 mm, the factor is:

$$\text{eye-box power factor} \approx \frac{9 \text{ mm} \times 20 \text{ mm}}{\pi(1.5 \text{ mm})^2} = 25.5$$

Equation 4

The total power requirement at 532 nm is then 0.66 mW.

At least one independent researcher is critical of manufacturer's claims for laser scanning device resolution.[xlv] The overall system performance will maybe limited by the projection module and therefore its performance capabilities and limitations to be verified include:

Update rate
Latency
Horizontal resolution
Vertical resolution
Color gamut
Brightness
Dynamic range
Contrast ratio The biggest limitation is the horizontal frequency of the scanning mirror because the frame rate multiplied by the vertical resolution is directly limited by this value. High frame rate is used to combat various causes of simulator sickness, and vertical resolution is necessary for acuity and adequate field-of-view.

New scanning technologies may provide significant improvement in the horizontal scan frequency. In particular, the plasmonic scanner being developed by Ultimara and Stanford University may dramatically improve this parameter.

Smaller and faster lasers with less power are needed for RSD versus the wall projection application. Multiple independent groups are pursuing the smart phone format wall projection application. Alternative scanning approaches are being pursued in addition to maximizing the potential of MEMS. Currently the following applications and perhaps others are driving development of laser scanning technology: automobile HUD, embedded in smartphone for portable projection.

Volume production and manufacturing does not seem to be a problem as Celluon is producing large is producing large numbers of these divides. The product is viable since the units are selling for $350, and the STM smartphone will be priced like a smart phone. These prices are acceptable for customers entering the mobile projector market. Our estimate for the 10 million unit volume cost for purchasing video projection modules is approximately $20.

Projection Optics

HOE for Display, Aberration Mitigation and Eye-Box Formation

Volume Grating Specification
  Angular Selectivity: FWHM<4 degrees
  Wavelength Selectivity: FWHM<50 nm
  Diffraction Efficiency: >60 percent
  Grating Pitch<5000 line pairs per mm
  Thickness>10 microns
Surface Grating Specifications
  Diffraction Efficiency: 20 percent
  Grating Pitch<2500 line pairs per mm (>=400 nm peak to peak)
  Hoxel Size>=10 microns The baseline HWD design uses two holographic optical elements to create an enlarged eye-box that maintains a wide FOV, and to remove image optical aberrations from the system. The eye-box size is determined by the number of recordings present in each HOE. HOEs can overcome the normal conservation of etendue that limit classical optical systems. This is because holograms have the ability to simultaneously create more than one optical state in phase space, whereas conservation of etendue would normally limit the device to a single optical state in phase space. In the case of HWDs, the phase space state is given by the product between the eye-box sizes and its FOV. However, HOEs can create more than one eye-box simultaneously to the viewer without compromising the FOV. As such, HOEs can help create an expanded eye-box that exceeds classical limits. In particular, HOEs can be used to "clone" a single eye-box perspective into an array of eye-box spots at the pupil of each eye. By carefully locating the placement of each "cloned" eye-box spot, it is possible to ensure that the eye pupil always receives a complete image across an expanded eye-box area.

There are two fundamentally different types of holograms, namely surface and volume. For a detailed discussion on thin vs. thick (surface vs. volume) holograms, see I.A1AAPPENDIx H. Surface holograms are orders of magnitude easier to print directly from computer generated data.$^{xlvi}$ Over the last seven years, Technicolor has developed an extremely effective method for using Blu-ray disk manufacturing to generate computer-generated metalized masters from which to subsequently mass produce high quality replicas through an embossing process. Blu-ray printing technology enables superior optical quality to volume holograms which are accurate representations of the computer generated data. Technicolor's holographic grating consistency, substrate surface flatness, and manufacturing repeatability make their approach highly desirable.

Surface holograms contain multiple diffracted orders in addition to one designed for the HWD operation. These additional diffraction orders generate noise in the system that can scatter into environment or the eye. The uniformly scattered noise that does enter the eye leads to a loss in contrast of the displayed imagery. In addition to generating multiple diffraction orders, surface holograms have no ability to discriminate between different wavelengths or angles of incoming light. As a consequence, surface holograms cannot selectively operate on specific light while filtering out others. This makes them very susceptible to generating higher amounts of background noise than volume holograms Volume holograms follow Bragg diffraction which selectively diffracts light coming from specific wavelengths and directions. The rest of the light is strongly filtered (reflected) resulting in a very significant reduction in noise generation and propagation within the system. Grating information is stored within a volume instead in a single surface enabling them to contain much more information than their surface hologram counterparts. In fact, it is possible to encode hundreds of different surface holograms into a single "multiplexed" volume hologram. While many types of materials can be used to store volume holograms, we will only consider the photopolymer holographic material (PP) since it best suited for mass production and has high performance. More specifically, we are favoring the newer Bayer photopolymer since it has improved optical performance over the competing, and older, DuPont photopolymers. Unfortunately, volume holograms cannot be directly created from computer generated data in the same manner as Technicolor's surface holograms In addition, volume holograms cannot be mass-produced with the same simplicity, low cost, and ease as surface holograms embossed from metalized blue ray master holograms. Volume holograms are only viable when the performance of an equivalent surface hologram is found to be insufficient. The Bayer and DuPont photopolymers are typically 10-12 microns thick sufficient to enable significant wavelength and angular selectivity.

Hexagonally packed eye-box spots of a given separation are used to most efficiently create an eye-box of a certain size. Light is split up among the spots so, for a given eye-box size, a larger spot separation will increase the light entering each spot. The maximum spacing is constrained by the size of the eye's pupil. An eye-box centered on the optical axis of the eye needs to be large enough to accommodate for lateral movement of the eye that occurs when the user's gaze shifts to comfortable extremes. A first order approximation of this value is derived in APPENDIX A and is 9 mm in diameter. The eye-box size can also be used to accommodate for interpupil distance (IPD) variations among a population of users. An IPD range from 51 mm to 74 mm accounts for the majority of the population. If the eye-box is to account for the gaze range of the eye and the IPD range of the population then it must be at least 22.5 mm horizontal and 11 mm vertical. This is described more in depth in APPENDIX A.

Each spot is created by an independent holographic recording in the physical medium. Ultimately the signal-to-noise ratio found in each spot limits of number of spots that can be useful. In particular, as the number of spots in the system is increased, there is a corresponding increase to the level of noise present. Unfortunately, with surface holograms in particular, this increase may not merely be linear with the number of spots but can even be strongly nonlinear and disproportionate with the increased number of spots. Fortunately volume holograms offer greater immunity to crosstalk noise and increasing the feasible number of spots.

There are two types of noise present in the head worn displays under consideration: crosstalk noise and scattering noise. Scattering noise is result of optical perturbations from microscopic structures in the holographic material that cause unintended light scattering. Crosstalk noise is a result of signals from different holographic layers getting diffracted into unintended directions by subsequent holographic layers. (Note: that there is actually a third type of hologram noise called intermodulation noise. However, this noise is not present here by design and can therefore be omitted from this discussion.) If the total number of generated spots is small, the scattering noise is usually insignificant. However, as the number of spots is increased, the diffraction efficiency from each spot becomes reduced and the scattering noise grows. The maximum number of spots is reached when either the crosstalk noise or the scattering noise begins to outcompete the intended diffracted signals present. For volume holograms with multiple exposures, crosstalk effects can be mitigated and scattering noise is likely to be the limiting factor for the eye-box size. For surface holograms, however, crosstalk noise is dominate and determines the maximum number of spots available.

While the surface hologram technology is the least expensive to create and easiest to mass produce, it is limited in application since it more susceptible to crosstalk noise. This is because it has no ability to discriminate between different angles of incidence and therefore cannot filter out unwanted optical angles that cause the crosstalk noise. In this quest to determine the practical limits on the eye-box size, a baseline HWD design has been explored with surface hologram technology. Preliminary computer simulations of its crosstalk noise have suggested that at least seven spots in a surface hologram can be created without unacceptable noise levels. As a result of these computer simulations, this baseline design has been determined with 7 spots arranged in a hexagonal pattern and a spot interspacing of 2.5 mm The resulting eye-box size of this design is ~10 mm in diameter. While this baseline design offers some insight into a potential eye-box size, further research is required to determine the maximum upper limit on the eye-box size by surface hologram technology.

These limitations are not a problem when using volume hologram technology; however, other problems arise. Volume holograms, such as those made using photopolymers, can discriminate between different angles of incidence and therefore offer a significantly reduced level of crosstalk noise for the same number of spots. At this point, more experimentation is needed to determine the maximum number of spots that can be sustained by either volume or surface holograms in this application. There is good evidence from the work of other researchers that a very large number of holograms can be successfully recorded "multiplexed" within a single substrate. For example, one holographer, Steve Hart has successfully demonstrated recording as many as 400 holographic exposures in a single volume hologram. In such a case the modulation depth of the photopolymer must be accounted for in order to preserve a high level of diffraction efficiency.

With this evidence, it appears that many more spots may be possible for a volume hologram-based system than for a surface hologram. With volume holograms, it appears that a sufficiently large number of spots with a corresponding larger eye-box size could even eliminate the need for mechanical adjustment of interocular spacing. As an example, 34 spots is sufficient to generate a single color display eye-box size of 22.5 mm×12 mm If the display is full color instead, then 135 spots would be required for the same eye-box size. However, as stated above and derived in APPENDIX A, the largest eye-box that is required will be of size 22.5 mm×11 mm Preliminary research has indicated that such eye-box sizes may indeed be possible with the volume hologram approach. The number of holograms required to generate particular eye-box dimensions. As the eye-box size increases so do the number of required holograms and the cost to create them.

HOE materials and fabrication methods are discussed in what follows. There are five possible hologram formats for HOE fabrication methods under present consideration:
 (Method 1) Standard Sinusoidal CGH
 (Method 2) Blazed CGH
 (Method 3) Standard CGH Transferred to PP
 (Method 4) Blazed CGH Transferred to PP
 (Method 5) Analog PP
(Method 1) Standard Sinusoidal CGH The standard computer generated hologram (CGH) is the most basic surface hologram format available. Based on Blu-ray production technology from Technicolor, it is the easiest and cheapest hologram to mass produce. These holograms contain sinusoidal grating structures that result in three diffracted orders: plus one, zero, and minus one. Of these three orders, only the plus one order contributes to the desired signal and the remaining orders only contribute to noise. In the design of HWDs, the scattering noise of the Standard Sinusoidal CGH limits the eye-box size that can be supported by such holograms
(Method 2) Blazed CGH Blazed computer generated surface holograms use a sawtooth grating structure rather than the sinusoidal or binary structure of more standard computer generated holograms This has the potential ability to generate only the plus one diffracted order without the added noise of the minus one and even the zero diffracted orders. At this moment, blazed surface holograms are in developmental production stages at Technicolor and the full capability for mass production of blazed surface holograms is not yet known. If Technicolor can be successful in mass-producing blazed surface holograms, this represents the best possible performance in a surface hologram technology. With the use of blazed surface holograms, it becomes possible to increase the size of the eye-box relative the Standard Sinusoidal CGH.
(Method 3) Standard Sinusoidal CGH Transferred to PP The previous two hologram formats under discussion have been surface holograms Next we will consider the production of volume holograms in photopolymer (PP). As mentioned previously, volume holograms suffer from an increased difficulty in using computer generated data. Rather than attempting to write computer generated holograms directly into a volume hologram, it is proposed to first create a surface hologram that is optically transferred into the volume hologram by reconstruction of its wavefront. In fact, in the most general case, it is necessary to produce two surface holograms that correspondingly determine the reference and object recording wavefronts for the volume hologram. When the Standard Sinusoidal CGH from Technicolor is used, the zero and minus one diffracted orders of each surface hologram must be suppressed by some optical means such as locating the surface hologram some distance away from the volume hologram and blocking the unwanted diffracted orders.
(Method 4) Blazed CGH Transferred to PP If a Blazed CGH can be used instead of the Standard Sinusoidal CGH, the minus one diffracted order is no longer present and it becomes possible to simplify the transfer of optical data into the photopolymer. In some cases, it even becomes possible to place the surface hologram in direct physical contact with the volume hologram and expose the light through the surface hologram into the volume hologram.
(Method 5) Analog PP Computer generated holograms can offer unique advantages over traditional holograms. In particular, CGHs may offer solutions for problems that are impractical to solve in any other way. In addition, CGHs eliminate any uncertainty in the precision of the resulting hologram and may not require as much investment in optical hardware. In other cases, however, conventional holographic recording set-up may be superior when the added cost in both time and expense of the computer generated holographic production places a high burden on the production process; provided a traditional hologram recording geometry can be found. In particular, for the maximum possible eye-box size, a large number of independent exposures must be incorporated into the volume hologram from uniquely created surface holograms. With such a large number of exposures, the required number of surface holograms can become a significant cost in the overall operation and a more traditional hologram fabrication approach may be worth further consideration.

H1 and H2 play different roles in the optical HWD design yet they are highly interdependent. While any of the five formats described above may be used with either H1 or H2, the nature of these holograms lend themselves to different solutions. In particular, H1 will generally experience much less crosstalk and background noise than H2. As such it is more likely the case that H1 can be fabricated from a direct surface hologram solution (Methods 1 or 2) while H2 is more likely better suited for a volume hologram solution in photopolymer (Methods 3, 4, or 5). In some cases, however, where the need for inexpensive mass production is great and the required eye-box size can be relaxed, it may be possible to directly fabricate both H1 and H2 with a surface hologram (Methods 1 or 2).

The two holographic optical elements need to be tested as a part of a system with the curved lens and projection optics. The best way to test these elements is on a bench-top test-rig station that includes both the curved lens and projection optics. The same test rig will likely be used to align and bond two holograms and curved lens together. The projection optics on the bench-top test-rig station could either be fitted to final HWD assembly or it can be integrated into the test-rig station.

The testing process involves measurement of both the eye-box properties and the final image on the back the retina. In particular, the test rig needs to measure the size and brightness of each spot with the expanded eye-box of spots. In addition, the projected image properties of the point spread function, modulation transfer function, contrast, field-of-view, spatial distortion, and sharpness through each eye-box spot should be measured. Both of these measurements may be accomplished initially qualitatively by human inspection in order to achieve coarse alignment of the components and then later quantitatively with machine vision methods to accomplish the final component alignment.

The eye-box properties are influenced by the thickness and dynamic range of the volume hologram used in the system. These material considerations ultimately limit the maximum eye-box size we are able to produce. Hologram quality can limit performance due to the introduction of aberrations in the display image formation. In particular if the emulsion shrinks or swells during fabrication the spatial resolution and diffraction efficiency performance suffers leading to image degradation. Mechanical registration and tolerance can limit the throughput of the volume hologram fabrication and assembly.

There are several emerging technologies that could dramatically improve the performance of the holographic optical elements. These include computer generated volume holograms and other new methods to fabricate custom graded index refractive elements.[xlvii] Both of these technologies could enable improved signal-to-noise performance and expanded eye-box sizes for the system. It appears likely that these new technologies would be the result of performance gains in 3D printing of optical elements. In particular, as 3D printing continues to improve in spatial resolution and material flexibility, it seems to be only a matter of time before 3D printed volume holograms and optical components in general become feasible.

By 2020, due to the loss of market share from video streaming services, it is highly likely that Blu-ray fabrication will wane unless it finds a new market such as holographic optical element manufacture. At the same time, with further increases in head worn device production, it is quite likely that holographic optical element manufacture will become more mainstream and perhaps commonplace.

Compared to other types of high technology, such as integrated circuit manufacture, the risks and challenges of holographic optical elements in either surface or volume format is quite minimal With sufficient volume demands, the hologram production could easily become mainstream. The manufacturing biggest risk/challenge is going to be the alignment and finally assembly. In particular, high mechanical tolerances could influence large volume production. Extra care must be taken in the mechanical design to relax assembly tolerances as much as possible. At the same time, the manufacturing methods will require fully automated alignment and high speed processing in order to minimize costs and increase reliability.

Until now, there has not been a strong market for the mass production of HOE's. Most of the mass market in holography is centered on anti-counterfeiting measures, decorations, and product labeling. With the emerging market of head worn displays, this is likely to change. At present, surface hologram manufacturing based on Blu-ray technology has matured to the greatest level. In particular, mass production of the Blu-ray based holograms are fully realizable with today's manufacturing capabilities. Unfortunately, Blu-ray technology cannot directly support the mass manufacture of volume holograms While excellent photopolymer materials now exist for the mass production, the actual mass production methods for volume holograms is still emerging.

Blu-ray disk manufacturing which can support surface hologram production costs approximately $1 USD to produce 4 holograms in quantities of 10 Million This does not include initial non-recurring expenditures which are in the tens of thousands. Our current design relies on volume holograms and which would require custom manufacturing and material testing. Our estimate to produce these 4 volume holograms (enough for 2 units) is approximately $2 USD in quantities of 10 Million. Non-recurring costs would be on the order of $500,000. These costs depend on many factors which include access to materials, investment or collaboration with suppliers, fabrication facilities, and process automation.

Curved Transparent Mirror (CTM)

The role of the curved transparent mirror (CTM) is to provide a reflective substrate from which the display video content can be reflected into the eye with high efficiency, while maintaining a nearly unnoticeable clear see-through vision experience. The curvature of the CTM plays a critical role and allows for extra degrees of freedom within the design.

TABLE 3

| Current CTM design specifications (likely to change) | | |
| --- | --- | --- |
| Radius of Curvature | Distance from entrance pupil | mirror tip angle |
| 50.8 mm | 45 mm | 30 degrees |

The baseline system has a spherical lens that is coated to be highly reflective at the three laser wavelengths of the projection system while maintaining a low reflectance (anti-reflectance coating) at all other wavelengths. This allows the lens to remain optically transparent across most of the visible spectrum. In addition, this lens has a constant wall thickness that contains no optical power and does not magnify or distort the see-through vision of the system. Although other curved surface shapes, such as elliptical or parabolic, have been considered, the baseline spherical lens shape has the lowest mechanical tolerances and is the least expensive to obtain and mass-produce. The use of a spherical surface simplifies the aberration mitigating properties incorporated into the holographic optical elements. In addition, while elliptical and parabolic surfaces may behave ideally for a single off-axis design angle, these shapes have more severe aberrations at other angles. In contrast, the aberration properties of the spherical surface shape are far more relaxed and performance is less sensitive to changes in angle.

The material of choice for applications requiring the ultimate in eye protection is polycarbonate. Polycarbonate is utilized in safety goggles, riot shields and motorcycle helmet visors, because it is the toughest transparent material. There are bullet-proof transparent ceramics, however these materials spall fragments from the surface opposite to that impacted, and therefore do not protect the eye from the more common but less severe impacts. The optical transparency of certain grades of polycarbonate exceeds that of many glasses.[xlviii] The material has one limitation, it has a relatively soft surface prone to scratching. To solve this problem, anti-scratch coatings have been developed in the ophthalmic industry. In addition there are coatings to repel dirt, water and resist smudges (oleophobic), and anti-reflection coatings. Polycarbonate lenses can be mass produced using injection molding techniques. This is relatively low cost, although initial NRE is required to manufacture the molds.

Looking through a flat window, if the window is rotated, the line-of-sight is displaced laterally but not deviated in angle. Looking through a curved window along the radius of curvature there is no displacement or angular deviation. However, looking through a curved window other than along a radius of curvature, there is an effective amount of prism, and the line-of-sight is slightly deviated in angle. An exaggerated case to explain the concept. The prism exists because the slope of the surface at the exit of the rays differs from the slope of the surface at the entrance of the rays. If the angular deviation is not the same for both eyes, then unless the brain performs extra work to correct the problem, the two eyes will not look in exactly the same direction. High-end sunglasses are designed to have "horizontal prism balance" to mitigate this issue. Cheap sunglasses do not have this consideration, and may feel less comfortable to wear, and provide vision that is less clear or creates more visual fatigue. The test is that two laser beams separated by a nominal IPD are made to converge at some distance (tens of meters) and the sunglasses are placed in front of the beams to determine their effect on the convergence.[xlix] With curved transparent mirrors in front of the eyes, comfort in wearing the proposed HWD can be affected by this issue. When the eye-box is expanded to cover a range of IPDs, for IPDs at the extremes the entrance pupils of the eye will be displaced from the center of curvature of the spherical lenses. It must be checked that the prism balance is within desirable limits. The inner concave surface will be coated to reflect the display light and therefore must maintain the required curvature. In principle the outer surface could be machined to provide personal ophthalmic prescriptions, so that spectacles did not have to be worn underneath the HWD lenses. Volume costs on the order of 10 million units will be relatively inexpensive compared to other components because we are using a spherical optometrist blanks in our current design. The estimated volume cost is <$1. This proves beneficial not only on cost but also in that it provides added safety for the user.

Rugate Coatings

In the baseline design, a curved window with spherical surfaces (spherical meniscus lens without power) is placed in front of each eye. A reflective coating on the inner surface is utilized to direct images into the eye. A rugate coating is deposited onto the inner lens surface to make it a highly reflective mirror at the projector laser wavelengths (450 nm, 520 nm, 635 nm) while allowing the lens to remain optically transparent for the rest of the visible spectrum.[l] As such, the coating can provide >80% transmission for see-through photopic vision. In addition, this lens has a constant wall thickness such that it has no optical power and does not magnify or distort see-through vision.

The purpose of having a curved lens in front of each eye is to reflect the displayed light to the eye, and to transmit all other wavelengths. Under the premise that the augmented reality display should first do no harm to the see-though vision, the photopic transmission must be as high as possible so vision is not impeded. This is particularly important in dark conditions in which wearing a pair of sunglasses would represent a handicap.

Rugate coatings are an advanced type of thin film coating featuring layers with continuously variable index of refraction.[li] These coating were originally developed by Walter Johnson and Robert Crane at the Wright Laboratory at Wright-Patterson AFB beginning in about 1982. The technology is now commercially available. Rugate technology allows the production of very narrow notch filters without subsidiary peaks to hinder transmission at other wavelengths. Rugate coatings are often used to provide laser eye protection (LEP) with minimal compromise of normal photopic vision. Use in LEP implies that these coatings can provide very significant optical density at the required wavelengths. A coating once offered in the Edmund Optics catalog, with optical density exceeding 3.0 at the design wavelength. demonstrates a filter designed for LEP which offers an optical density exceeding 5.0 for 532 nm and NIR with reflectivity exceeding 99.5%.[lii] The transmission is approximately 92% everywhere else. These filters are deposited on flat substrates.

Rugate coatings have a refractive index profile that varies continuously with depth. This differs from the discontinuous refractive index profile produced by conventional optical coatings comprised of a stack of layers. The continuously varying refractive index allows for the creation of coatings with very high reflectivity over extremely narrow wavelength bands, allowing for photopic transmission exceeding 80%. Conventional coatings have not been demonstrated to achieve as high a photopic transmission for a given optical density in the reflection band. The rugate coating would provide an anti-reflection coating for the transmitted wavelengths. The higher the optical density at the center wavelength and design angle of incidence, the higher the reflectivity at other nearby angles of incidence. Higher optical density at the center wavelength requires a thicker coating.

Optical coatings are in general most easily applied to glass, where higher temperatures and vacuum deposition techniques work well. However, lenses placed in front of the eye are no longer made of glass for safety reasons. Almost all ophthalmic lenses today are made of plastics. The ophthalmic plastic with the best rating for eye protection is polycarbonate, which is utilized for riot shields and motorcycle helmet visors. Optical grades of polycarbonate exist that actually have higher transmission and clarity than many types of glass. Polycarbonate is extremely tough but has a relatively soft surface and scratches more easily than some other plastics. Anti-scratch coatings have been developed to solve this problem.

The inner surface of the lens would be coated with the rugate or conventional coating to reflect the display light to the eye. Current designs specify the surface as spherical. The lens can therefore be manufactured using a standard ophthalmic lens blank provided that the optical design is compatible with a spherical curvature equal to that of a standard base curve. A possible option would be to machine spectacle prescriptions into the outer surface of the lens. However, the lens would nominally be machined with no see-through power ("plano") and with a thickness as thin as possible; yet, consistent with the required rigidity.

It might seem doubtful that a vender for rugate coatings on curved polycarbonate could be located. However, there happens to be a defense-related application for just such a lens. Laser eye protection (LEP) is becoming important in the military, and a defense contractor has been located who deposits rugate coatings on curved polycarbonate lenses for this purpose. They have verbally quoted us in the past for designing a coating for our wavelengths and depositing it on lenses. Rugate coatings are ideal as they can provide optical densities of OD5 or more at any set of laser wavelengths, yet at the same time provide high photopic transmission.

Trex has searched for additional venders and located one that is willing to try depositing rugate coatings on curved plastic, but they would first have to first develop a process for deposition on plastics. Most coating venders deposit on glass only. A vender was found that deposits rugate at low temperatures and can deposit on plastics, however they state that their process uses liquids and is incompatible with a curved surface.

The achievable photopic transmission can be estimated in an Excel spreadsheet given the widths of the reflectivity bands. There are several issues. The wavelength of laser diodes varies with part number and from projector module to projector module. The wavelength of any given laser diode varies with temperature. In Celluon Pico projectors utilizing Sony made scanning engines, there are two green lasers (close but not equal in wavelength) and two red lasers (close but not equal in wavelength). The purpose of two lasers could be to suppress speckle in imagery displayed on diffusely reflecting surfaces. Speckle is absent in the proposed HWD application as the lasers are not reflected from a diffusely reflecting surface. However, if the Sony engines are utilized as made, the effective source bandwidth is at least tripled for the green and red wavelengths. One additional factor is that the angle of incidence varies from top to bottom of the lens, and if the same coating design is deposited on all portions of the lens, the width of the reflecting bandwidth must be increased to allow for this variation in angle of incidence. However, allowing for these factors still provides for very high photopic transmission exceeding 80% as proven by the curved combiner.

The coating would be tested for reflectivity at the display wavelengths over the surface area utilized. The correct angle of incidence would be required for each spot on the lens, which would require a fixture to hold the lens and scanning source in the correct configuration. To eliminate the effects of power drift, two power meters may be utilized, one monitoring a fraction of the output from the scanning engine (beam splitter used to sample) and the other looking at the reflected light. Small integrating spheres may be required to average the non-uniformities of the detectors.

The coating would be tested for photopic transmission at the angle of incidence utilized by the eye when the lens is worn. The angle of incidence would then be varied to cover the see-through field-of-view. A constant-power white light source of known effective temperature could be measured with a power meter after passing through the lens at the same angle of incidence utilized by the eye. A method to correct for the photopic curve would be required. Leakage of beams through the lens is probably not a concern, but could be measured. The amount of light reflected is correct for viewing, so any small fraction leaking through would hardly be visible.

Photopic transmission is given in percent, 100% meaning all external visible light (lumens) reaches the eye, and 0% meaning that no visible light reaches the eye. The requirement is a minimum of 35%, but with rugate coatings values in excess of 80% should be possible, and values exceeding 90% may be possible. This is made possible since polarizers are not required.

It is possible that the coating could have higher reflectivity in some regions than others leading to a non-uniformity in reflection. If the non-uniformity of the light reaching the eye is less than 0.3% it cannot be detected with the best contrast sensitivity at high luminance on of the order of 300. The luminance non-uniformity specification is better than 85% (15% non-uniformity). A fixed non-uniformity could be corrected for in software.

There are emerging hard coat technologies that can create notch filters like a rugate. In the past, Edmund Optics used to sell rugate notch filters. They still sell narrow notch filters but it is unclear if they are rugate coatings. When contacted a few years ago, their process required high temperatures and vacuum compatible with glass. The obstacle would be to develop a deposition process compatible with some optical plastic material. One idea is to first coat the plastic with a barrier layer such as silicon monoxide, and then to coat the barrier layer with the desired coating. Methods may be required to reduce outgassing of the plastic during deposition.

The 2020 roadmap of rugate or similar coatings may be trailblazed by effort set forth by the military. Provision of laser eye protection while providing high see-through photopic transmission is becoming a larger need for the military and for pilots every day. The proliferation of very powerful, inexpensive and compact solid-state lasers is driving the need for this. Missiles are very expensive, while drones are inexpensive. It has become clear that shooting expensive bullets (missiles) at inexpensive targets (e.g. drones) is not an economically favorable way to fight battles. Therefore there is a substantial push to develop laser weapons, for which the cost of a "bullet" is small compared to the cost of a missile. This suggests that future battlefields will feature many deployed laser weapons, and require all warfighters to wear appropriate laser eye protection. Therefore the necessary rugate-like technologies will be developed due to the military need.

Trex is currently aware of only one vender that deposits rugate coatings, which presents a risk. There is a second vender willing to research how to accomplish it. Rugate coatings are thick and take longer to deposit than conventional coatings. The time required for deposition factors into the cost of the coating. However, significant thickness is only required for obtaining the ultimate laser eye protection, which are not required in the HWD application. Military personel mentioned that an increased thickness of the rugate coatings makes them prone to delamination if the temperature varies significantly. However, when the LEP vender was questioned on this topic they denied that this was an issue for their coatings.

Large volume production of these coatings has yet to be exercised. The rugate coatings are currently produced by a sole source vender and are expensive. Rugate coatings might be made a commercial product but it is likely this has yet to be attempted. Conventional coatings exist with reduced photopic transmission. Anti-reflection, anti-scratch, and hydrophobic coatings are mass-produced for ophthalmic lenses. We are optimistic that with the correct partners and process the 10 million unit volume cost may be made as low as $2. Typically, special vacuum deposition runs cost something of the order of $1000-$1500. The question becomes how many parts can be coated in one run. Repeating a regular processes can be less expensive. This is possibly the one part with the largest uncertainty in mass production cost.

Localized Opaqueness Control

In real world scenes, most objects are opaque (solid) and occlude (block) light coming from their background. Display imagery of AR HWD systems does not behave this way and can appear unnatural. The AR objects displayed in see-through HWDs appear translucent, rather than opaque, since light from the projected AR object mixes with light from the background scene. As a consequence, the virtual object appears ghostly, and the contrast is diminished. It becomes difficult to determine the distance to the AR object since occlusion is used by the brain as a cue for this task. The projector illumination can be increased so light from the AR object overcomes the background light but this makes the AR objects unrealistically bright. In some situations where the background illumination is very bright, the displayed imagery can be washed out or unrecognizable.

The two conventional methods to ensure AR objects appear opaque and occlude their background include video relay and optical relay. In video relay there is no optical see-through path, but rather cameras are placed in front of the eyes, and their imagery is presented in a display. Here software is used to replace potions of the scene with AR objects. No such display can reproduce the field-of-view, color, resolution, and visual fidelity of optical see-through vision. In optical relay, the scene is optically relayed to a window with localized opaqueness control, such as an LCD panel, and then optically relayed to the eye. This approach offers very limited see-through field-of-view and transmission, and the required hardware is physically large. According to the goal of "doing no harm to natural see-through vision," both approaches fail.

Trex has proposed a novel approach for localized opaqueness control that does not suffer from any of the issues plaguing the optical and video relay schemes. Opaqueness is generated at spatially localized regions in the see-through lens of the HWD at video rates. It cannot; however, be in focus with the AR objects generated amongst the background scene since it is physically located close to the eye. This essentially means that the resolution of the opaqueness is significantly reduced and typically less than that of the display. Nevertheless, the out-of-focus localized occlusion can dramatically improve the contrast of virtual objects and prevent washout. If the opaqueness is restricted to the interior of virtual objects rather than overfilling them, the objects appear significantly more solid and the presence of translucent edges is less noticeable. To obtain maximum opaqueness resolution with this concept, proper placement of the opaqueness requires knowledge of the location of the pupil of the eye within the eye-box provided by the EHMS. This approach can be referred to as opaqueness-in-the-lens since the opaqueness generating layer is placed on one of the two surfaces of the CTM substrate, which otherwise acts essentially as the see-through lens of a safety goggle. Applications include (1) provision for the occlusion of individual virtual objects, (2) provision to make regions behind text, maps, pictures and actionable indicators opaque rendering the AR content easier to read against a bright background, and (3) provision for sunglasses to be of variable localized optical density.

The original method proposed for implementation of opaqueness-in-the-lens was to utilize fast photochromic dyes in the lens, activated by a scanning ultraviolet-A or Blu-ray (405 nm) beam. Fast photochromic materials exist, and this method has been demonstrated, but utilizes significant power. The faster the photochromic dye, the greater the power consumption. There are alternative methods of implementation, as described in TABLE 4. LCD and electro-wetting have greatly reduced power consumption. LCDs are a very mature technology but due to the use of a polarizing filter, see-through transmission is limited to a theoretical maximum of 50%, and significantly less in practice. Pixelated electro-wetting can offer very high levels of opaqueness and very high levels of see-through transmission in the non-opaque state. Electro-wetting is therefore a method of considerable interest. However, there are currently no commercially available devices, although the technology has been demonstrated.

In TABLE 4, PC refers to "photo-chromic." BR refers to mutant "bacteriorhodopsin," which is a photochromic material produced in nature[liii] It has excellent longevity and the sample Trex experimented with was prepared 15 year ago. Pseudogem-black is a nick-name for a fast color-neutral photochromic material recently developed by a group in Japan.[liv] LCD refers to "liquid crystal display" and has the disadvantage that it requires polarizing filters to operate. Hence the transmission is a maximum of 50% in theory and much less than that in practice. This would be a handicap when used in darkened conditions. Pixelated electro-wetting displays were considered as a replacement for LCDs with reduced power consumption because the backlight would not have to suffer loss in a polarizer. However, the technology went up against a very mature LCD technology and manufacturing infrastructure and has been sidelined. Currently Amazon purchased AquaVista and may utilize the technology to produce a tablet form reader.

TABLE 4

Methods for implementation of Opaqueness-in-the-Lens

| Method | Curved Lens | Optical Density | Transmission | Other Issues |
|---|---|---|---|---|
| BR - PC | No issue | 1.0+ | Yellow tint | Power to clear, Sunlight clears |
| Pseudogem black - PC | No issue | (0.5) | Good | Lifetime, fluorescence, laser λ, thermal decay |
| Pseudogem green - PC | No issue | (0.5) | Good | Lifetime, laser λ, thermal decay, not color neutral |
| Diffusing LCD | Issue | — | Good | Blocks contrast not light, need TFTs for lock-on, electric connect |
| Monochrome LCD | Issue | (0.8) | 50% max | Need TFTs for lock-on Electrical connection |
| Laser Written LCD | Less of an issue | (0.8) | 50% max | Polarized skylight activation? |
| Electro-wetting | Issue | 2.0+ | Good | Need TFTs for lock-on Electrical connection |

(PC = photo-chromic, LCD = liquid crystal display)

The performance parameters to be tested and characterized include the following:
  Photopic transmission in the non-opaque state (minimum optical density)
  Maximum optical density in the opaque state
  Uniformity of optical density in the opaque state
  Number of grey scale values if optical density is variable
  Spectral transmission of the film in the non-opaque state (color neutrality)

Spectral transmission of the film in the opaque state (color neutrality)
Turn-on and turn-off time constants
Opaqueness resolution in arc-minutes for given eye pupil sizes
Power consumption for full opaqueness normalized to solid angle
BR-Photochromic System performance specifications
Photopic transmission in non-opaque state >80%
Optical density 1.5 at 550 nm, less in the red, not color neutral
Yellow tint in transmitting state
Power consumption high to generate opaqueness
Power consumption required for non-opaque state (red LED imbedded in lens)
Transition speed depends upon power consumption and ΔOD—150msec possible
Electro-Wetting System
Photopic transmission in non-opaque state >75% demonstrated
Optical density 2.0 color neutral
Color neutral in transmitting state
Power consumption low to generate opaqueness
No power consumption required for non-opaque state
Transition speed
10msec demonstrated The pixelated electro-wetting is an emerging technology that offers perhaps the best overall performance because of the greatly reduced power consumption and large optical density change.

The 2020 roadmap for localized opacity control includes pixelated electro-wetting devices that attempt to outperform the LCD approach due to the electro-wetting's significantly reduced power consumption. This is due to the elimination of the polarizing filters. However, LCD has proliferated the market and is well proven. Electro-wetting was new and had not yet demonstrated longevity and reliability. However, the advantage of lower power consumption will eventually win in the wireless age.

Pixelated electro-wetting is currently being considered for e-readers. Amazon purchased the largest company working on pixelated electro-wetting devices (AquaVista). Gamma Dynamics is now a holding company licensing its technology. Gamma Dynamics devices had a limited lifetime, so further research on longevity is required. University groups are still working on electro-wetting displays. Varioptic in France is selling variable lenses based upon electro-wetting technology.

The fast photo-chromic "BR" material utilized in the demonstrated approach requires hermetic sealing to maintain the correct humidity value to provide optimum function. This is currently being developed.

The risk for this technology is that there is only one known source for BR—a company in Germany who uses it for security related applications. They grow a mutant version of a bacterium and harvest the BR protein from the bacteria. However, the methods could be reproduced in other locations if necessary to support the new application. The photo-chromic approach generally has a challenge of using too much power consumption. The faster the PC material is driven, the more power is required. In the near UV there is no retinal hazard, and eye safety simply requires limiting the accumulated dose to the maximum permissible exposure published in the ANSI Z136.1 2014 standard. This is best accomplished by designing the system so that the small component reflected from the lens misses the cornea. Blu-ray (405 nm) is very affordable laser technology but unfortunately falls just beyond the 400 nm cutoff for retinal hazard. Laser diode technology for wavelengths below 400 nm is currently much more expensive, as there are currently no mass-produced devices for commercial products.

As stated earlier, Gamma Dynamics electro-wetting display devices quit working after a few years, so now that they are no longer being produced, no functioning devices are available for demonstration purposes. This indicates that longevity and reliability need work. It has become more difficult to get information from AquaVista since they were purchased by Amazon, but presumably they are actively looking at the possibility of an e-reader. However, Amazon purchased AquaVista from Samsung, who evidently decided not to pursue the technology for some reason. The challenge is to develop something slightly different than an e-reader. Fabrication on a curved surface with good transmission in the off state is required. Other groups have demonstrated both of these aspects. Regarding volume production, electro-wetting device manufacture personnel claim that they can utilize existing LCD fabrication lines. BR is currently expensive, simply because it is not mass-produced for a commercial product. We hope that with strategic technology development the 10 million unit volume cost would be $10.

Dynamic Image Focus Control

The concept is that an electronically variable focus element placed just prior to the beam scanning mirror can be utilized to adjust or vary the divergence of the scanning beams. For focus at infinity, the beams are nominally collimated at the eye. In order to have the display in focus when the wearer of the HWD is focusing on something close, the beams must be divergent at the eye. Variable focus has several potential applications in the proposed HWD. These include the following:

To adjust focus of AR content such as text and diagrams to be in focus with near work or far work, optionally incorporating a mechanism of autofocus To provide "true" or "complete" 3D imagery with both correct vergence and correct focus cues To correct for defocus variations in the display field-of-view due to the optical design Most HWDs are not variable focus, and many choose to have a constant focus at infinity. However, if the purpose of the HWD is say to provide schematics to a mechanic, the worker may prefer to have the schematics in focus with the parts being worked on, possibly to one side. It takes considerable time for a person to change focus from near-to-far, and back again. In one study of navy fighter pilots, subjects were required to recognize the orientation of a Landolt C optotype at 20/20 resolution, both at 18" and then at 18 feet.[lvi] The minimum time for the pair of optotypes to be correctly recognized in succession was measured. The minimum average time exceeds 500 msec for the youngest and fastest accommodating subjects. Other studies have measured much longer times for accommodation.[lvii] A corollary is that if autofocus were to be employed the variable lens would not have to be fast. Adjustment of several diopters can utilize a half second and keep up with the fastest accommodating eyes.

It is suspected that visual depth cues must agree to prevent the nausea of simulator sickness in a substantial fraction of the population. Typically to obtain 3D images, the retinal disparity is provided, but not the correct defocus corresponding to the vergence. For instance, at 3D movies presented on flat screen, retinal disparity is provided to make objects appear to move close and far, but the eyes are always focused at a fixed distance (the screen). In cases of large motion in depth, a significant number of individuals will eventually experience nausea when only retinal disparity is provided to indicate range. It has been proposed that this is due to an evolutionary adaptation in which the brain decides that the only way such conflicting signals can arrive at the brain is if a poisonous substance has been consumed. Consequently an urge to throw up (nausea) is generated. The solution is to include a defocus adjuster in the display so that the focus of the virtual object agrees with the retinal disparity provided for it. If there is only one virtual object or multiple virtual objects at essentially the same range, this would be straightforward. If there are multiple virtual objects distributed at significantly different ranges, an additional strategy must be employed. If the defocus adjuster is fast enough, all of the virtual objects can be given their proper focus. Another approach is to properly focus the virtual object being looked at (if gaze tracking in included in the HWD) or properly focus the one closest to where the head is pointing (e.g. in the center of the display FOV).

In some curved transparent mirror optical design architectures, there is a variation in defocus from top to bottom of the display. This variation can be corrected simply through a variation in the defocus lens power at the frame rate. At a 60 Hz frame rate the frame period is 17 msec. The response time of the Varioptic Arctic 316 electro-wetting lens is approximately 10 msec, and substantial optical power variation can be generated at 60 Hz.

When the scanning beams are smaller than the entrance pupil diameter of the eye, and the array of exit pupils does not fill the entrance pupil of the eye, then the depth-of-focus is increased. For instance, with 0.5 mm diameter beams and one exit pupil in the eye, even 5 diopters of defocus has little significant impact, and the display will be in focus when looking from infinity to 20 cm away.

Variable focus has been incorporated into three benchtop demonstration setups at Trex.

The roving high-acuity zone demonstration included an Optotune liquid lens, the power of which was controlled by varying a voltage adjusted (in the demonstration) by a knob.

One of the holographic demonstrators included a miniature electro-wetting Arctic 316 lens manufactured by Varioptic in France.

In a benchtop setup without a display, a variable LCD lens manufactured by LensVector has been tested and evaluated. It is one of the most compact lenses examined, and it was developed for cell phones.

The LensVector and Varioptic lenses were originally developed for cell phones. However, cell phones initially utilized mechanical lens adjusters and mechanical currently dominates the "fancier" electro-optic technologies.

The result of testing and evaluation at Trex is the following. Optotune lenses are too large for a HWD. The optical quality of LCD lenses is not as good as the optical quality of electro-wetting lenses. Varioptic is willing to make a smaller and faster version of the Arctic 316, which is already small enough for a HWD. Their longevity appears to be good. Holochip claims that they can produce a variable lens that is faster than those made by Varioptic. However, they tend to make lenses for larger apertures.

The performance parameters to be tested and characterized include the following:
Chromatic variation of defocus power, if any
Verify focus at infinity
Measure closest point of focus
Speed of focus change
Power consumption
Aberration level during rapid focus change
Verify autofocus performance, if applicable
Electro-wetting Lens performance specifications
Clear aperture 2.5mm
Power range 18 diopters (5cm to ∞)
Transmission 97%
Operating temperature −20 to 60° C.
Silent
Power consumption 1 mW Developing technologies that may improve performance include voice coil actuation used commonly in cell phones. With the great infrastructure and investment in the cell phone industry this technology is advancing rapidly and it is unclear if the improvement have reached fundamental limits. It may be that a mechanical solution will be fast enough in the future and have less bulk, weight and power consumption than the alternatives. This industry will likely drive the 2020 roadmap of the variable focus lens technology.

The risk is in how to predict if the best solution is mechanical or another emerging technology. Every technology that has gone up against the mechanical solution in cell phones has essentially lost. However, the one parameter that is useful that may not be available in a cell phone focus adjuster is speed of focus. A fast enough lens might allow for multiple virtual objects at varying range to all have appropriate focus. Volume production and cost on the order of 10 Million units of variable lens technology has been accomplished by the cell phone industry. At these unit volumes the costs are less than $1 USD.

What is claimed is:
1. An augmented reality head worn device comprising;
   a. a curved transparent mirror,
   b. a scanning light source defining a field of view,
   c. a holographic optical element (HOE) adapted to provide exit pupil expansion to create an enlarged eye-box, and
   d. at least one projection system for providing pixels optically mapped to a pixel density;

TABLE 3

Variable Lens Options

| Company | Technology | Model | Size (mm) | Weight | Dynamic Range (Diopters) | Speed | Power |
|---|---|---|---|---|---|---|---|
| Varioptic | Electro-Wetting | Arctic 316 | 8 × 2 | 300 mg | 18 | 10 ms | 1 mW |
| LensVector | Liquid Crystal | LVAF | 4.5 × 4.5 × 0.5 | 22 mg | >10 | 20 ms | 80 mW |
| Optotune | Liquid Lens | EL-6-18 | 18 × 19 × 9 | 6.7 g | 18 | 2 ms | 350 mW | wherein modulated red, green and blue lasers and a MEMS mirror micro-scanner are utilized to encode a display video illumination through conditioning and focusing optics onto the HOE and the HOE corrects for optical aberrations, replicates an image signal to create hexagonally packed exit pupil eye-box spots which are then redirected toward the curved transparent mirror which in turn directs the hexagonally packed exit pupil eye-box spots into the enlarged eye-box wherein the hexagonally packed exit pupil spots create the enlarged eye-box.

2. The device as in claim 1 wherein the transparent mirror is coated with a rugate coating.

3. The device as in claim 1 wherein the light source is a laser light source.

4. The device as in claim 1 wherein the light source is a full color light source.

5. The device as in claim 1 wherein the pixel density is uniform.

6. The device as in claim 1 wherein the pixel density is non-uniform.

7. The device as in claim 1 wherein the HOE is a surface hologram.

8. The device as in claim 1 wherein the HOE is a volume hologram.

* * * * *